United States Patent
Yamakawa et al.

(10) Patent No.: US 10,162,176 B2
(45) Date of Patent: Dec. 25, 2018

(54) HEAD-UP DISPLAY DEVICE

(71) Applicant: NIPPON SEIKI CO., LTD., Niigata (JP)

(72) Inventors: Yasuhiro Yamakawa, Niigata (JP); Makoto Hada, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 15/549,506

(22) PCT Filed: Dec. 22, 2015

(86) PCT No.: PCT/JP2015/085820
§ 371 (c)(1),
(2) Date: Aug. 8, 2017

(87) PCT Pub. No.: WO2016/129186
PCT Pub. Date: Aug. 18, 2016

(65) Prior Publication Data
US 2018/0024356 A1 Jan. 25, 2018

(30) Foreign Application Priority Data
Feb. 9, 2015 (JP) .................... 2015-022992

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 26/10* (2013.01);
(Continued)

(58) Field of Classification Search
CPC .... G02B 27/0101; G02B 27/01; G02B 26/10; G02B 2027/0196; G09G 3/025; G09G 3/02; G09G 3/20; H04N 5/64; B60K 35/00
See application file for complete search history.

(56) References Cited

U.S. PATENT DOCUMENTS

| 7,482,730 | B2 * | 1/2009 | Davis ................. | G02B 26/0833 |
| | | | | 310/311 |
| 2004/0223195 | A1 * | 11/2004 | Nomura ............. | G02B 26/0841 |
| | | | | 358/509 |

(Continued)

FOREIGN PATENT DOCUMENTS

| JP | H07-270711 A | 10/1995 |
| JP | 2003-302590 A | 10/2003 |

(Continued)

OTHER PUBLICATIONS

International Search Report issued in Application No. PCT/JP2015/085820 dated Mar. 29, 2016, with English translation.

*Primary Examiner* — Jose Soto Lopez
(74) *Attorney, Agent, or Firm* — McDermott Will & EmeryLLP

(57) ABSTRACT

Provided is a head-up display device with which it is possible to display an image easily recognized by a user. A display for a display mechanism in the head-up display device includes: a light source unit capable of generating light that is the origin of a scanning line; a scan unit for scanning light in a first direction and in a second direction using a first scan element and a second scan element, respectively; a processing unit for generating a first drive signal having a frequency that matches the resonance frequency of the first scan element; and a drive unit for executing a resonance mode that is based on the first drive signal. The processing unit generates a second drive signal (Continued)

having a variable display waveform that is dependent on the resonance frequency, fixed first non-display waveforms that are not dependent on the resonance frequency, and a variable second non-display waveform that is dependent on the resonance frequency. The drive unit drives the second scan element in a non-resonance mode that is based on the second drive signal.

7 Claims, 12 Drawing Sheets

(51) Int. Cl.
    *G02B 26/10*      (2006.01)
    *G09G 3/02*      (2006.01)
    *G09G 3/20*      (2006.01)
    *H04N 5/64*      (2006.01)

(52) U.S. Cl.
    CPC ............... *G02B 27/01* (2013.01); *G09G 3/02* (2013.01); *G09G 3/025* (2013.01); *G09G 3/20* (2013.01); *H04N 5/64* (2013.01); *G02B 2027/0196* (2013.01)

(56) References Cited

U.S. PATENT DOCUMENTS

| | | | | |
|---|---|---|---|---|
| 2009/0059179 A1* | 3/2009 | Kobori | ............... | G03B 21/28 353/52 |
| 2009/0290814 A1* | 11/2009 | Yoo | ............... | G06T 3/4023 382/305 |
| 2010/0321750 A1* | 12/2010 | Burinskiy | ............... | G09G 3/02 359/198.1 |
| 2011/0109950 A1* | 5/2011 | Ito | ............... | G09G 3/025 359/198.1 |
| 2011/0170156 A1* | 7/2011 | Takayama | ............... | G02B 26/085 359/213.1 |
| 2012/0001961 A1* | 1/2012 | Nishikawa | ............... | G02B 26/105 345/690 |
| 2013/0120225 A1* | 5/2013 | Hanada | ............... | G09G 1/10 345/15 |
| 2013/0176490 A1* | 7/2013 | Seo | ............... | H04N 5/08 348/530 |
| 2013/0307887 A1* | 11/2013 | Hanada | ............... | G02B 26/0833 345/691 |
| 2014/0293230 A1* | 10/2014 | Arase | ............... | G02B 27/0101 353/13 |
| 2014/0313558 A1* | 10/2014 | Davis | ............... | G02B 26/0833 359/200.8 |
| 2015/0022783 A1* | 1/2015 | Lee | ............... | G06F 3/1423 353/20 |
| 2016/0116732 A1* | 4/2016 | Yasuda | ............... | G02B 26/085 359/200.7 |
| 2017/0140689 A1* | 5/2017 | Kobori | ............... | G09G 3/02 |

FOREIGN PATENT DOCUMENTS

| | | |
|---|---|---|
| JP | 2010-078824 A | 4/2010 |
| JP | 2010-217736 A | 9/2010 |
| JP | 2013-072778 A | 4/2013 |

* cited by examiner

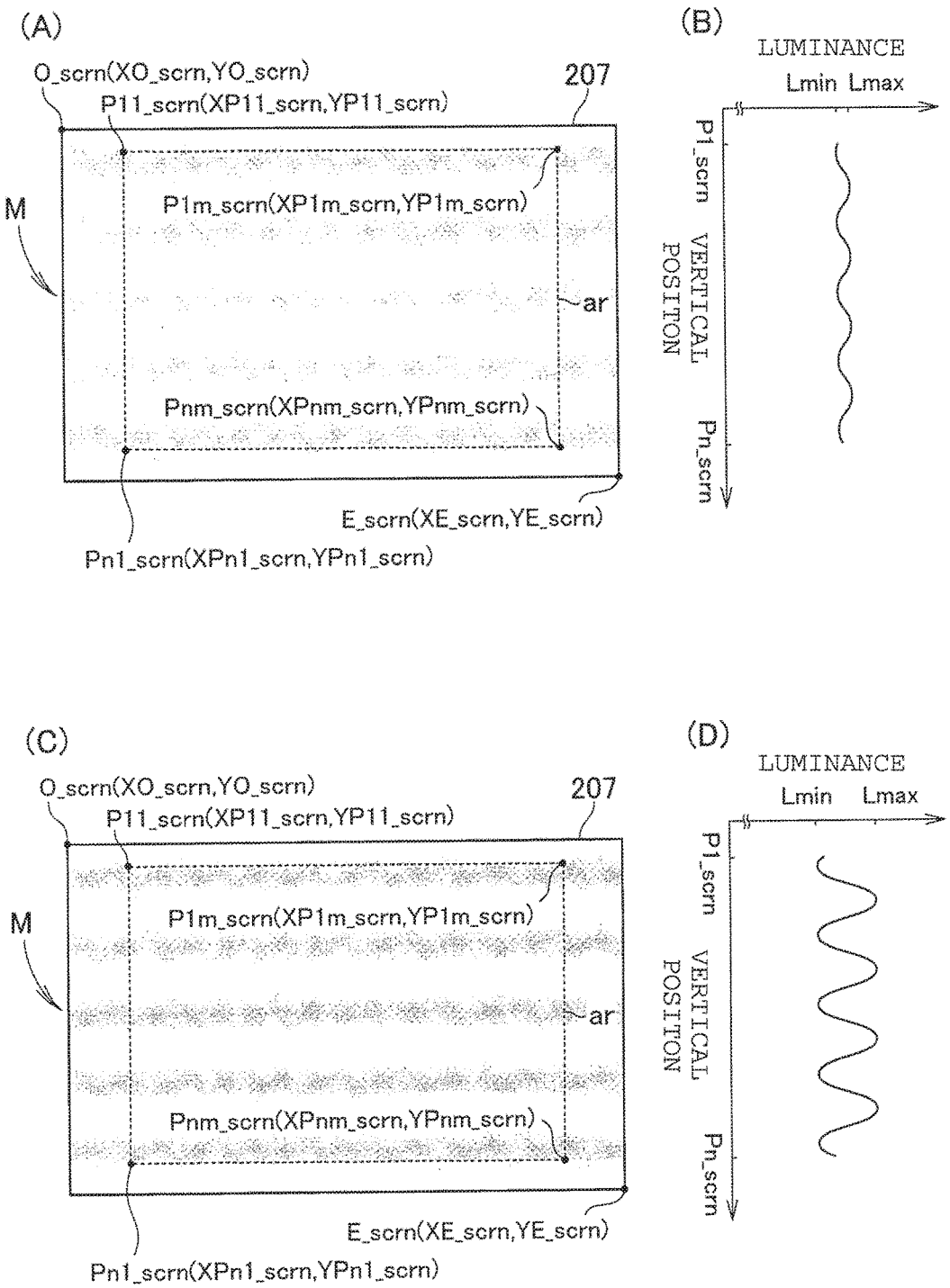

HEAD-UP DISPLAY DEVICE

RELATED APPLICATIONS

This application is the U.S. National Phase under 35 U.S.C. § 371 of International Application No. PCTJP2015/085820, filed on Dec. 22, 2015, which in turn claims the benefit of Japanese Application No. 2015-022992, filed on Feb. 9, 2015, the disclosures of which are incorporated by reference herein.

TECHNICAL FIELD

The present invention relates to a head-up display (HUD) device.

BACKGROUND ART

For example, PTL 1 discloses an information display device that optically modulates laser light from a laser light source based on display information using an optical modulator and then inputs the modulated laser light to a deflector. Next, the deflector guides the light reflected and deflected in the y-axis direction to another deflector, and another deflector 4 two-dimensionally scans the light reflected and deflected in the x-axis direction on the surface of a screen such as, for example, a diffusion screen or directivity-limited screen. In addition, PTL 1 discloses, for example, a rotatable mirror, a galvanometer mirror, and a rotatable polygon mirror as such deflectors and display information is reflected to the screen by rotation or vibration of such deflectors. In addition, PTL 1 discloses an information display device having such a screen on the wind shield (front glass) of a vehicle, as a head-up display device for vehicles.

Next, for example, PTL 2 discloses an image display device in which a light source unit emits red light, green light, blue light, or light (compound light) obtained by combining these types of light to a collimating optical system and then the collimated image light is input to a horizontal scan unit. The horizontal scan unit horizontally scans the image light at high speed and guides the image light to a vertical scan unit via a relay optical system. The vertical scan unit vertically scans the image light at high speed. An eyepiece optical system (another relay optical system) guides the two-dimensionally scanned image light to the user's eyes (pupils). In addition, for example, PTL 2 discloses, for example, a galvanometer mirror or the like as such a scan unit. Such an image display device is generally referred to as a head mounted display (HMD) by those skilled in the art.

Next, for example, PTL 3 discloses an image display device for vehicles that is capable of displaying, on the wind shield, information concerning actual scene so that the virtual image of the information is superimposed on actual scene from the viewpoint of the driver of the vehicle. As a display unit for displaying or projecting such information onto the wind shield, a two-dimensional scan system including two deflectors and two scan units described above is generally adopted.

CITATION LIST

Patent Literature

PTL 1: JP-A-07-270711
PTL 2: JP-A-2010-217736
PTL 3: JP-A-2013-072778

SUMMARY OF INVENTION

Technical Problem

In the image display device in PTL 2, the high speed scan element of the horizontal scan unit is driven in the resonance mode and the low speed scan element of the vertical scan unit is driven in the non-resonance mode. However, when the low speed scan element of the vertical scan unit rotates or vibrates based on the vertical drive signal (non-resonance mode), the low speed scan element is slightly resonated. In other words, since the low speed scan element has a specific resonance frequency, when high frequency components of the vertical drive signal include this specific resonance frequency, the low speed scan element is resonated by the high frequency components. Accordingly, the image display device in PTL 2 reduces high frequency components of the vertical drive signal (non-resonance mode) having the specific resonance frequency of the low speed scan element by performing low-pass filtering and notch filtering on the vertical drive signal having a sawtooth-shaped waveform.

However, the inventors and the like have recognized that such a vertical drive signal (non-resonance mode) should be improved. Particularly when such a vertical drive signal is applied to a head-up display device, the user (for example, the driver of a vehicle) recognizes ringing in information (image) projected or displayed onto a display medium (for example, the wind shield). In other words, when the low speed scan element of the vertical scan unit included in the head-up display device is resonated by high frequency components of the vertical drive signal, the image is difficult to recognize for the user.

By the way, in the image display device in PTL 2, the resonance frequency of the high speed scan element depends on the temperature. Accordingly, the horizontal drive signal (resonance mode) having the frequency identical to the resonance frequency also depends on the temperature. To keep the size (display range) of an image that is based on the horizontal drive signal and the vertical drive signal constant regardless of the temperature, the waveform of the vertical drive signal (non-resonance mode) needs to have the component (first waveform having an inclination that depends on the resonance frequency) that depends on the resonance frequency. Since such a vertical drive signal is subject to low-pass filtering and notch filtering after that to form an image, the inventors and the like have recognized that the image is more difficult to recognize for the user.

One object of the invention is to provide a head-up display device capable of displaying an image that is easy to recognize for the user such as the driver of a vehicle. Another object of the invention will be obvious for those skilled in the art by referring to the aspects illustrated below, best mode, and attached drawings.

Solution to Problem

Aspects according to the invention will be described below to easily understand an overview of the invention.

In a first aspect, there is provided a head-up display device provided with a display mechanism including a display and a reflector, the display including a light source unit capable of generating light that is an origin of a scanning line, a scan unit for scanning the light in a first direction and in a second direction using a first scan element and a second scan element, respectively, a processing unit for generating a first drive signal having a frequency identical to a resonance frequency of the first scan element, and a drive unit for driving the first scan element in a resonance mode that is based on the first drive signal, wherein the processing unit generates a second drive signal having a variable display waveform that depends on the resonance frequency, a fixed first non-display waveform that does not depend on the resonance frequency, and a variable second non-display waveform that depends on the resonance frequency, and the drive unit drives the second scan element in a non-resonance mode that is based on the second drive signal.

In the first aspect, when the second scan element (such as, for example, the low speed scan element or the vertical scan element) is driven based on the second drive signal (such as, for example, the low drive signal or the vertical drive signal), the second drive signal has the first non-display waveform. The first non-display waveform is fixed so as not to depend on the resonance frequency of the first scan element (such as, for example, the high-speed scan element or the horizontal scan element). In other words, the second drive signal can have the fixed first non-display waveform adjusted or set so as to reduce or suppress ringing caused in an image displayed in the display medium (for example, a wind shield). Accordingly, even in a situation in which the resonance frequency of the first scan element changes, the second drive signal of the first aspect can maintain the reduction or suppression of ringing.

By the way, in PTL 2, the vertical drive signal has only the waveforms (one first waveform and two second waveforms) that depend on the resonance frequency of the high speed scan element and has no waveforms that do not depend on the resonance frequency. Accordingly, even in a situation in which ringing is reduced at a particular resonance frequency, the inventors and the like have recognized that presence of possibility that reduction of ringing is not performed at another resonance frequency.

In contrast, in the first aspect, in the range in which the resonance frequency changes, the extent to which ringing is reduced or suppressed can be equalized in the fixed first non-display waveform of the second drive signal. In addition, in the first aspect, the second drive signal has the variable display waveform and the variable second non-display waveform that depend on the resonance frequency in addition to the fixed first non-display waveform. Accordingly, in the range in which the resonance frequency changes, the variable display waveform of the second drive signal can reduce or suppress fluctuations of the image size and the frame cycle and the variable second non-display waveform of the second drive signal can reduce or suppress fluctuations of the frame cycle.

In a second aspect that depends on the first aspect, the fixed first non-display waveform is set in a non-display section corresponding to the maximum level and/or the minimum level of the second drive signal.

At the maximum level of the second drive signal, the second drive signal changes from increase to reduction (that is, the maximum value is present). In addition, at the minimum level of the second drive signal, the second drive signal changes from reduction to increase (that is, the minimum value is present). Accordingly, at the maximum level and/or the minimum level of the second drive signal, many of high frequency components of the second drive signal are generated. In other words, many of high frequency components of the second drive signal are caused by changes in the second drive signal at the maximum level and/or the minimum level.

In the second aspect, the fixed first non-display waveform capable of reducing or suppressing ringing is set in the non-display section corresponding to the maximum level and/or the minimum level of the second drive signal. Accordingly, in the second aspect, the fixed first non-display waveform of the second drive signal can further equalize the extent to which ringing is reduced or suppressed in the range in which the resonance frequency changes.

In a third aspect that depends on the second aspect, the absolute value of a change rate of a level of the second drive signal at the maximum level and/or the minimum level may be the minimum value.

In the third aspect, the absolute value of the change rate of the level of the second drive signal at the maximum level and/or the minimum level is the minimum value, that is, the change rate is zero. Accordingly, high frequency components of the second drive signal are more difficult to generate at the maximum level and/or the minimum level in the third aspect.

In a fourth aspect that depends on the third aspect, when a current level of the second drive signal approaches the maximum level and/or the minimum level, the absolute value of the change rate of the current level may be gradually reduced to the minimum value.

In the fourth aspect, the change rate of the level of the second drive signal at a level close to the maximum level and/or the minimum level is small. Accordingly, high frequency components of the second drive signal are more difficult to generate at the maximum level and/or the minimum level in the fourth aspect.

In a fifth aspect that depends on the third aspect, when a current level of the second drive signal deviates from the maximum level and/or the minimum level, the absolute value of the change rate of the current level may be gradually increased from the minimum value.

In the fifth aspect, the change rate of the level of the second drive signal at a level close to the maximum level and/or the minimum level is small. Accordingly, high frequency components of the second drive signal are more difficult to generate at the maximum level and/or the minimum level in the fifth aspect.

In a sixth aspect that depends on any one of the first to fifth aspects, the display may further include a storage unit in which fixed data necessary to generate the fixed first non-display waveform is stored, and the processing unit may generate the fixed first non-display waveform based on the fixed data.

In the sixth aspect, the fixed data is stored in the storage unit. Accordingly, the processing unit does not need to generate the fixed data in real time. In other words, the load on the processing unit for generating the fixed first non-display waveform is reduced. In addition, since the fixed first non-display waveform does not depend on the resonance frequency of the high speed scan element, the capacity of the storage unit is reduced.

Since low-pass filtering and notch filtering need to be performed in real time in PTL 2, such loads are increased. Alternatively, when low-pass filtering and/or notch filtering is not performed in real time, the necessary amount of storage of data is increased.

In a seventh aspect that depends on any one of the first to sixth aspects, the processing unit may change a range of a level of the variable display waveform based on a temperature of the second scan element.

The temperature characteristics of the first scan element (such as, for example, the high speed scan element or the horizontal scan element) are generally smaller than the temperature characteristics of the second scan element (such as, for example, the low speed scan element or the vertical scan element). In other words, generally, when the temperature of the second scan element changes, the temperature characteristics of the second scan element do not easily affect the size of an image (that is, the temperature characteristics can be ignored). However, depending on the type of the second scan element, the effects of the temperature characteristics of the second scan element cannot be ignored.

In the seventh aspect, the processing unit can change the range of the level of the variable display waveform based on the temperature of the second scan element to reduce or suppress the effects of the temperature characteristics of the second scan element. Accordingly, in the range in which the temperature of the second scan element changes, the processing unit can reduce or suppress fluctuations in the size of an image.

Those skilled in the art can easily understand that the illustrated aspects according to the invention may be further changed without departing from the spirit the invention.

BRIEF DESCRIPTION OF DRAWINGS

FIGS. 6(A) and 6(B) are explanatory diagrams illustrating an image that is based on the vertical drive signal (first vertical drive signal) in FIG. 5A and the brightness thereof, respectively, and FIGS. 6(C) and 6(D) are explanatory diagrams illustrating an image that is based on a modification of the vertical drive signal (first vertical drive signal) in FIG. 5A and the brightness thereof, respectively.

DESCRIPTION OF EMBODIMENTS

The best mode described below is used to easily understand the invention. Accordingly, those skilled in the art need to note that the invention is not limited improperly to the embodiments described below.

Figure 1:
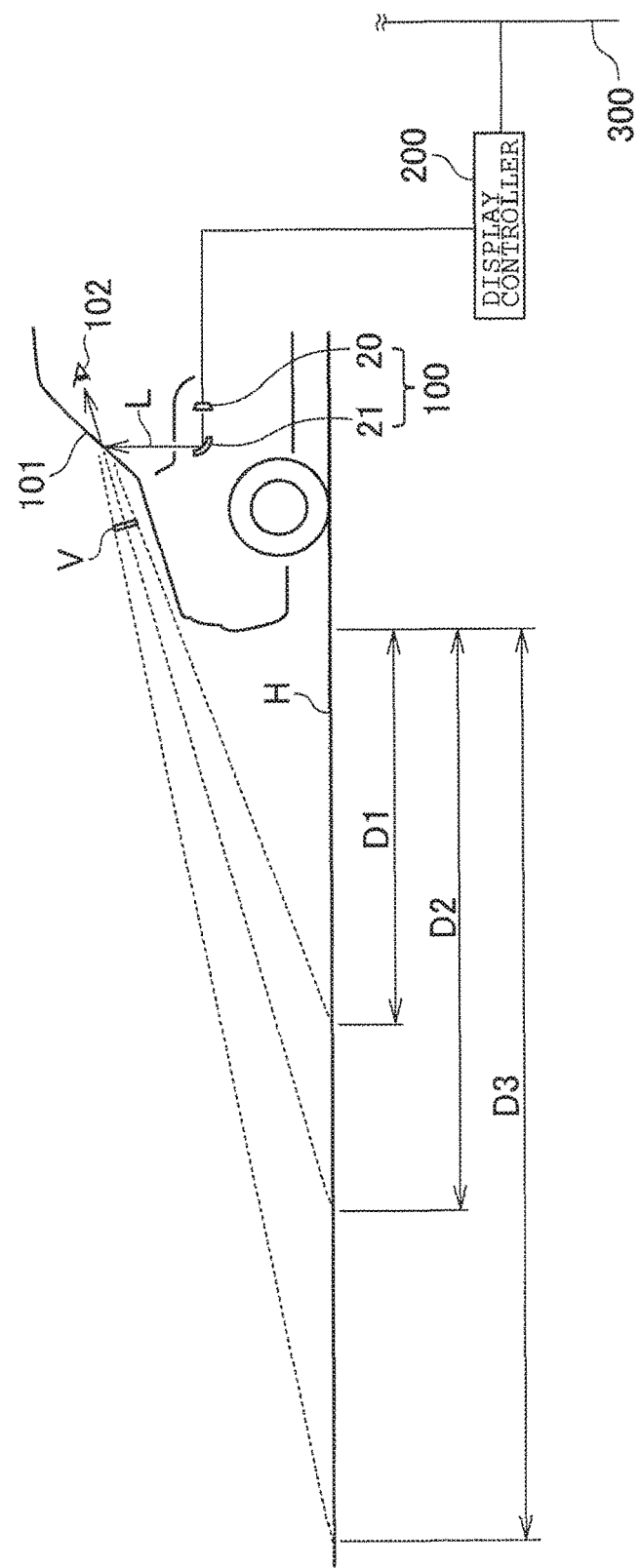
FIG. 1 illustrates an example of the schematic structure and an example of application of a head-up display device according to the invention.

FIG. 1 illustrates an example of the schematic structure and an example of application of a head-up display (HUD) device according to the invention. As illustrated in FIG. 1, the head-up display device is applied to a conveyance such as, for example, a vehicle and the head-up display device has a display mechanism 100. For example, a vehicle provided with the head-up display device or a head-up display system can generally have, for example, an imaging unit (not illustrated) in addition to the display mechanism 100. The imaging unit (for example, a camera) can take a picture of, for example, the road (actual scene on the road) in front of the vehicle. For example, the display mechanism 100 for vehicles projects vehicle information into the display range set on a wind shield 101 (for example, a part thereof) of the vehicle, that the vehicle information can be displayed in the display range with a virtual image V of the vehicle information superimposed on the actual scene from a view point 102 of the driver of the vehicle.

Of course, the head-up display system does not need to have an imaging unit and, for example, the display mechanism 100 for vehicles may display, as vehicle information, for example, the current speed of the vehicle, the speed limit of the road on which the vehicle is running, the route for guiding the vehicle to the destination, and the like obtained by an information obtainment unit (not illustrated) other than the imaging unit.

The display mechanism 100 of the head-up display device in FIG. 1 includes, for example, a display 20 and a reflector 21. Although the display mechanism 100 for vehicles is typically housed in the dashboard, all or part of the display mechanism 100 may be disposed outside the dashboard. The display 20, the head-up display device, and the head-up display system may be referred to as, for example, a projector, an information projection device, and an information projection system, respectively, for projecting information such as, for example, vehicle information to a display medium such as the wind shield 101.

The head-up display device for vehicles in FIG. 1 may have, for example, a display controller 200 in addition to the display mechanism 100. Although the display controller 200 for vehicles is typically housed in the dashboard, part or all of the display controller 200 may be disposed outside the dashboard. The display controller 200 in FIG. 1 typically includes, for example, a microcomputer and may include, for example, a CPU (Central Processing Unit), memories such as a ROM (Read Only Memory) and a RAM (Random Access Memory), input output interfaces, and the like. In FIG. 1, the display controller 200 is connected to a LAN (Local Area Network) 300 (for example, a bus type LAN) disposed or installed in the vehicle so as to receive part or all of vehicle information via the LAN 300. Of course, the display controller 200 may directly receive vehicle information and the like via, for example, sensors (not illustrated). The display controller 200 may generally referred to as an ECU (Electronic Control Unit).

In FIG. 1, the display 20 is electrically connected to, for example, the display controller 200 and the display 20 can receive image data indicating information such as vehicle information generated by the display controller 200. Of course, the display 20 may directly receive information by itself and generate image data. The display 20 in FIG. 1 can generate or emit display light L (projected light) that is based on image data and the reflector 21 can guide the light path of the display light L from the display 20 to the wind shield 101. This enables, for example, the driver to recognize the image (display light L indicating information such as vehicle information) displayed on the wind shield 101 as the virtual image V.

The vehicle (own vehicle) in which the head-up display device is to be mounted is, for example, an automobile in FIG. 1 and the automobile can travel in a horizontal line H or on the road. From the view point 102 of the driver, the height or depth of the virtual image V in FIG. 1 is set to predetermined distance from, for example, distance D1 to distance D3. In other words, from the view point 102 of the driver, the lower end of the virtual image V is present ahead of the vehicle by distance D1 and the upper end of the virtual image V is present ahead of the vehicle by distance D3, and the middle point of the virtual image V in the up-and-down direction is present ahead of the vehicle by distance D2. Distance D1, distance D2, and distance D3 are, for example, 20 m, 30 m, and 50 m, respectively.

Although one reflector 21 is illustrated in FIG. 1, the reflector 21 may include, for example, two reflectors (typically, a concave mirror and a plane mirror). In other words, the light path of the display light L from the display 20 to the wind shield 101 may be adjusted and distance D1, distance D2, and distance D3 may be adjusted according to the height (the sitting height of the ideal driver) of the view point 102 of the ideal driver and the light path of the display light L. In addition, the reflector 21 can generally enlarge the display light L from the display 20 and the reflector 21 or the display controller 200 can generally correct the distortion (for example, the distortion of the glass plane) in the display range, for example, partially set in the wind shield 101.

Figure 2:
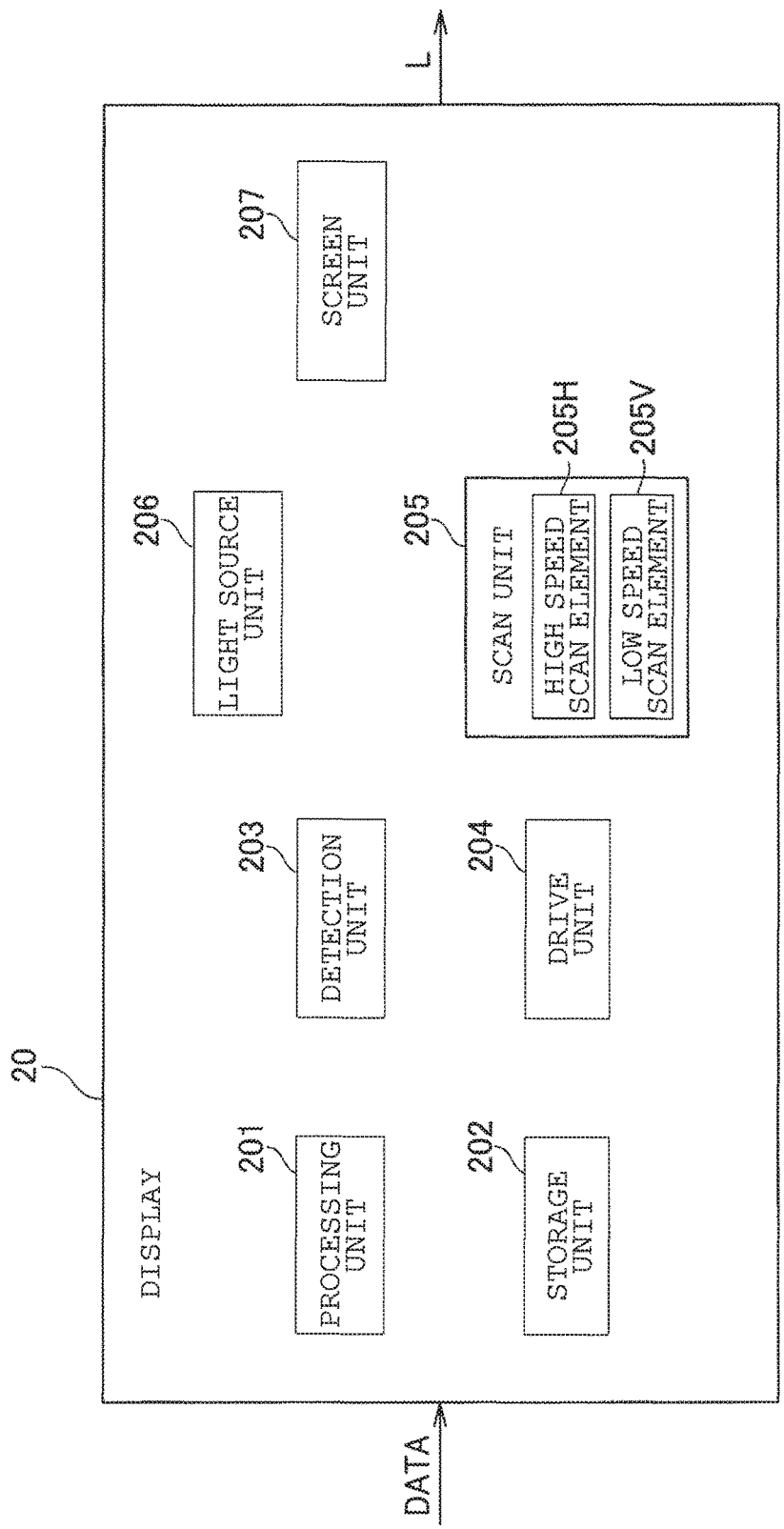
FIG. 2 illustrates an example of the schematic structure of the display in the FIG. 1.

FIG. 2 illustrates an example of the schematic structure of the display 20 in FIG. 1. As illustrated in FIG. 2, the display 20 includes, for example, a light source unit 206, a scan unit 205, a processing unit 201, and a drive unit 204. In addition, the display 20 in FIG. 2 may further include, for example, a storage unit 202, a detection unit 203, and a screen unit 207. The processing unit 201 typically includes a CPU and a RAM (work area), and the storage unit 202 typically includes a ROM (for example, an EEP (Electrically Erasable Programmable) ROM). For example, the ROM may store a program causing the CPU to execute predetermined operation (information display method) and the RAM can form the work area of the CPU. In addition, the ROM can store data required for controlling all or part of the light source unit 206, the scan unit 205, the drive unit 204, the storage unit 202, the detection unit 203, and the screen unit 207. The display 20 in FIG. 2 and the display controller 200 in FIG. 1 may be combined or integrated with each other.

The display 20 in FIG. 2 can receive, for example, image data DATA from the display controller 200 in FIG. 1 and generate the display light L based on the image data DATA. In FIG. 2, the light source unit 206 in FIG. 2 is capable of generating light, which is the origin of a scanning line, and includes three laser devices typically. The laser devices may be, for example, laser diodes (LD) and the laser devices generally have a resonator structure. The light source unit 206 capable of individually generating, for example, red light, green light, and blue light includes, for example, three laser devices. In addition, the light source unit 206 may further include an optical drive unit capable of driving, for example, three laser devices and an optical output unit (optical system) capable of synthesizing or collecting light of, for example, three colors to generate the display light L (synthetic light). The processing unit 201 in FIG. 2 can determine the intensity of the display light L (synthetic light) according to the image data DATA and control the optical drive unit so as to obtain the intensity. The optical drive unit may be provided in the drive unit 204 in FIG. 2.

The scan unit 205 in FIG. 2 adopts a two-dimensional scan system and the scan unit 205 includes the first scan element (for example, a high speed scan element 205H) and the second scan element (for example, a low speed scan element 205V) that can scan the display light L from the light source unit 206 in the first direction (for example, the horizontal direction) and the second direction (for example, the vertical direction), respectively. The drive unit 204 controlled by the processing unit 201 in FIG. 2 can drive the scan unit 205 (high speed scan element 205H and low speed scan element 205V). In other words, the drive unit 204 (for example, a voltage generation unit or voltage amplification unit) can have a first scan drive unit capable of driving the nigh speed scan element 205H and a second scan drive unit capable of driving the low speed scan element 205V.

The processing unit 201 in FIG. 2 can generate the first drive signal (for example, the horizontal drive signal) having the frequency identical to the resonance frequency of the first scan element (for example, the high speed scan element 205H) and generate the second drive signal (for example, the vertical drive signal) for the second scan element (for example, the low speed scan element 205V). The drive unit 204 (first scan drive unit) can generate a horizontal drive voltage that is based on the horizontal drive signal and apply the horizontal drive voltage to the high speed scan element 205H, and the drive unit 204 (second scan drive unit) can generate a vertical drive voltage that is based on the vertical drive signal and apply the vertical drive voltage to the low speed scan element 205V. The scan unit 205 may be, for example, a MEMS (Micro Electro Mechanical System) mirror and the MEMS mirror generally has a reflecting mirror (for example, a galvanometer mirror) as a mechanical component and a mirror drive unit (for example, a piezo element) as an electronic component. These components can be generally combined or integrated with each other to form a small mirror. The scan unit 205 may be generally referred to as a deflector.

The screen unit 207 in FIG. 2 is, for example, a translucent screen, and the display light L from the light source unit 206 reaches the back surface or bottom surface of the translucent screen via the scan unit 205 and then the display light L is released from the front surface or the top surface of the translucent screen. In other words, the screen unit 207 is the output unit of the display 20 and the screen unit 207 in FIG. 2 can guide the display light L to the reflector in FIG. 1. As described above, the screen unit 207 can form a display image (display light L in the screen unit 207 generated because the scan unit 205 two-dimensionally scans the display light L from the light source unit 205) on, for example, the font surface of translucent screen. The display image on the screen unit 207 may be generally referred to as a real image.

The detection unit 203 in FIG. 2 can have, for example, a resonance detection unit capable of detecting the resonance frequency of the high speed scan element 205H and a temperature detection unit capable of detecting the temperature of the low speed scan element 205V. Of course, the display 20 in FIG. 2 does not have to include the detection unit 203. In other words, the processing unit 201 may estimate the resonance frequency of the high speed scan element 205H by, for example, receiving data that is based on the resonance frequency via the LAN 300 and the display controller 200 in FIG. 1 without using the actual resonance frequency detected by the detection unit 203. The resonance detection unit of the detection unit 203 can detect, for example, the position caused by rotation or vibration of the high speed scan element 205H and the actual resonance frequency can be detected based on the position. Alternatively, the resonance detection unit of the detection unit 203 may detect, for example, the temperature of the high speed scan element 205H and estimate the resonance frequency based on the temperature. Next, since effects of the temperature characteristics of the low speed scan element 205V can be ignored depending on the type of the low speed scan element 205V, the detection unit 203 does not need to have the temperature detection unit capable of detecting the temperature of the low speed scan element 205V.

Figure 3:
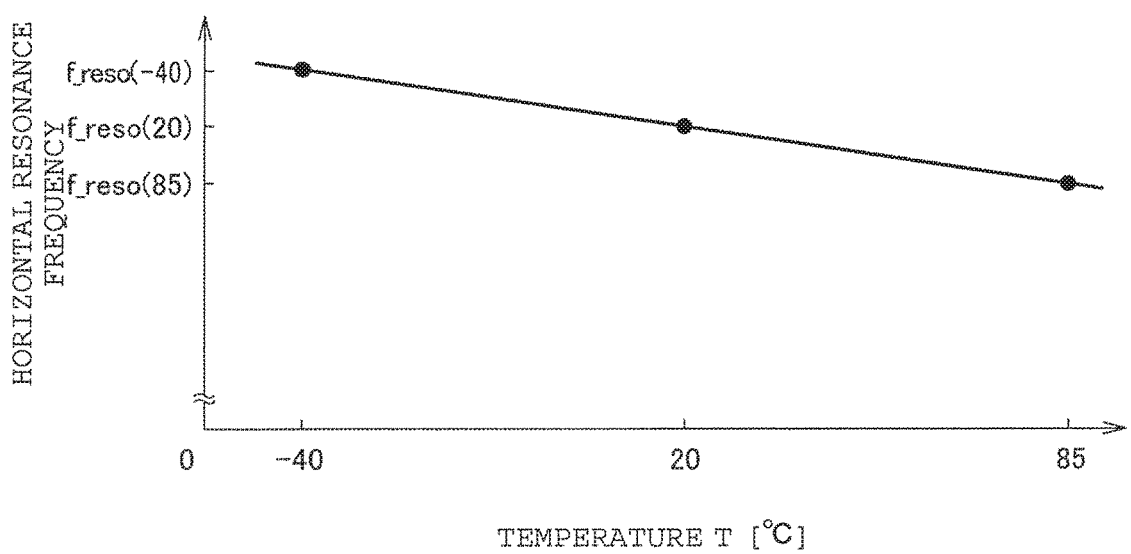
FIG. 3 is an explanatory diagram illustrating the temperature characteristics of the resonance frequency of the high speed scan element in FIG. 2.

FIG. 3 is an explanatory diagram illustrating the temperature characteristics of the resonance frequency (horizontal resonance frequency) of the high speed scan element 205H in FIG. 2. Since the temperature characteristics of the high speed scan element 205H are generally larger than the temperature characteristics of the low speed scan element 205V, those skilled in the art cannot ignore temperature changes in the resonance frequency (horizontal resonance frequency) of the high speed scan element 205H. Although the horizontal resonance frequency linearly changes with respect to the temperature in FIG. 3, the temperature characteristics of the high speed scan element 205H are not limited to those illustrated in FIG. 3 and the horizontal resonance frequency may change non-linearly. For example, the ordinary temperature or the standard temperature is, for example, 20 degrees centigrade and, in FIG. 3, a horizontal resonance frequency f_reso (−40) at, for example, −40 degrees centigrade on the low temperature side is higher than a horizontal resonance frequency f_reso (20) at 20 degrees centigrade. In contrast, a horizontal resonance frequency f_reso (85) at, for example, 85 degrees centigrade on the high temperature side is lower than the horizontal resonance frequency f_reso (20) at 20 degrees centigrade.

Since the high speed scan element 205H in FIG. 2 is driven by the horizontal drive signal (resonance mode) having the frequency identical to the resonance frequency (horizontal resonance frequency) of the high speed scan element 205H, the processing unit 201 in FIG. 2 receives the horizontal resonance frequency of the high speed scan element 205H detected by, for example, the detection unit 203 (resonance detection unit) and generates the horizontal drive signal having the frequency identical to the horizontal resonance frequency. In addition, the drive unit 204 (first scan drive unit) amplifies the horizontal drive signal at, for example, a predetermined amplification (first amplification) to generate a horizontal drive voltage (horizontal drive voltage having the frequency identical to the horizontal resonance frequency) that is based on the horizontal drive signal. Accordingly, when the temperature of the high speed scan element 205H is reduced, the rotation or vibration of the high speed scan element 205H driven in the resonance mode (horizontal drive voltage) by the horizontal drive signal is accelerated as the horizontal resonance frequency of the high speed scan element 205H is increased.

In contrast, when the temperature of the high speed scan element 205H is increased, the rotation or vibration of the high speed scan element 205H is decelerated as the horizontal resonance frequency of the high speed scan element 205H is reduced. Since such acceleration or deceleration has effects on the vertical drive signal (non-resonance mode) for driving the low speed scan element 205V, the processing unit 201 in FIG. 2 needs to generate the vertical drive signal (non-resonance mode) in consideration of the horizontal resonance frequency of the high speed scan element 205H detected by, for example, the detection unit 203 (resonance detection unit). In response to this, the drive unit 204 (second scan drive unit) can generate the vertical drive voltage that is based on the vertical drive signal by amplifying the vertical drive signal at, for example, a predetermined amplification (second amplification).

Figure 4:
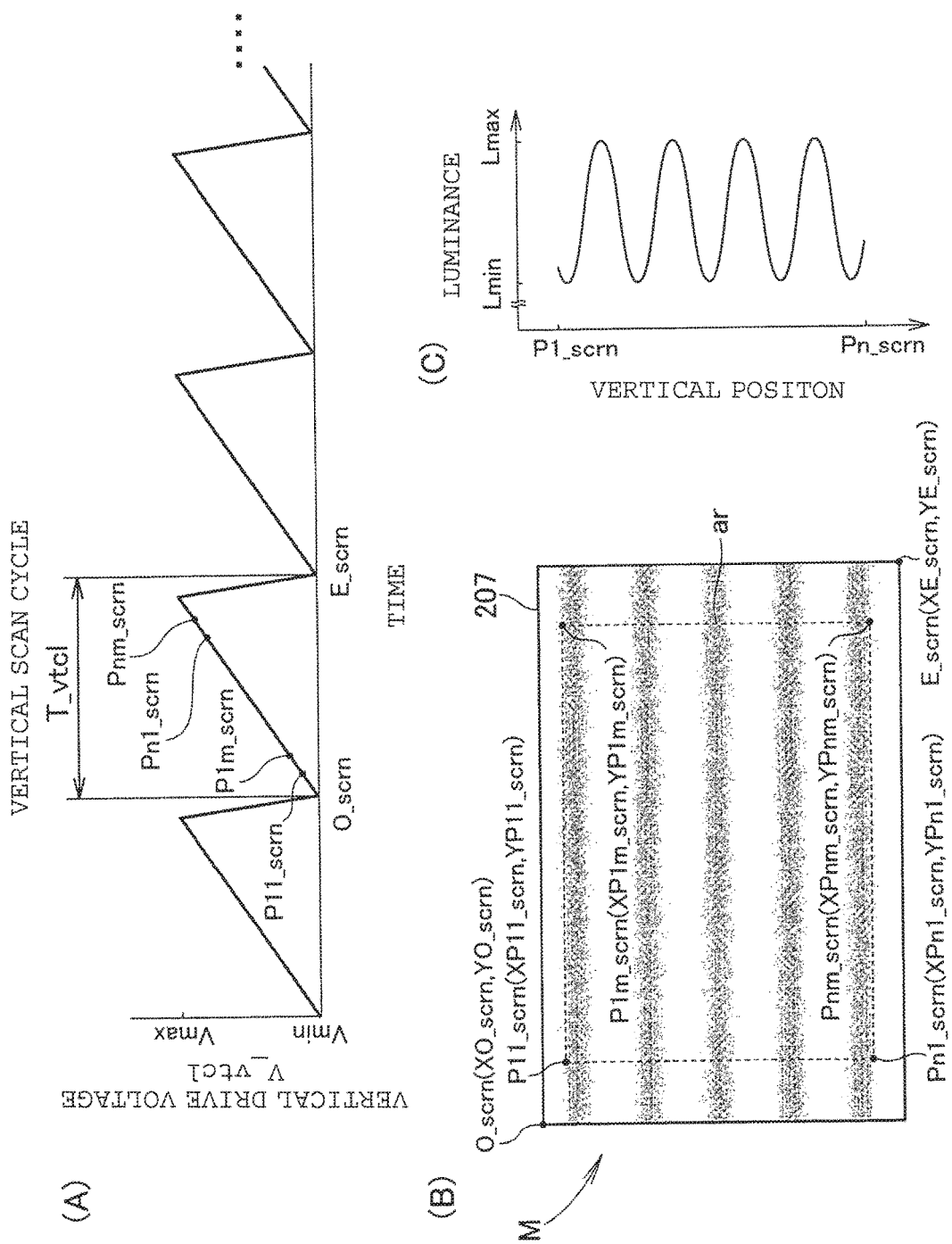
FIG. 4(A) is an explanatory diagram illustrating a conventional vertical drive signal and FIGS. 4(B) and 4(C) illustrate an image that is based on the conventional vertical drive signal in FIG. 4(A) and the brightness thereof.

FIG. 4(A) is an explanatory diagram illustrating the conventional vertical drive signal and FIGS. 4(B) and 4(C) are explanatory diagrams illustrating the image that is based on the conventional vertical drive signal in FIG. 4(A) and the brightness thereof. As illustrated in FIG. 4(A), a conventional vertical drive voltage V_vtcl has a sawtooth-shaped waveform.

The conventional vertical drive signal represents, for example, an analog voltage value and, by amplifying this voltage value at, for example, a predetermined amplification (second amplification) of the drive unit 204 (second scan drive unit), the conventional vertical drive voltage V_vtcl is generated. In other words, the maximum level and the minimum level of the voltage value of the conventional vertical drive signal are generated or set so as to correspond to the maximum value Vmax and the minimum value V min of the conventional vertical drive voltage V_vtcl. Accordingly, the conventional vertical drive voltage V_vtcl can be assumed to be substantially the conventional vertical drive signal and the conventional vertical drive signal has a sawtooth-shaped waveform similar to the sawtooth-shaped waveform in FIG. 4(A).

Of course, the conventional vertical drive signal represents, for example, a digital voltage value and, for example, a D/A converter (DAC: Digital to Analog Converter) may be provided in the drive unit 204 (second scan drive unit) instead of the processing unit 201.

In FIG. 4(B), the screen unit 207 is, for example, a translucent screen. A display image M is formed, for example, on the surface of the translucent screen based on the conventional vertical drive signal (conventional vertical drive voltage V_vtcl in FIG. 4(A)) and the horizontal drive signal (resonance mode). For example, the part of the display image M corresponding to one frame is formed by the display light L in the screen unit 207 generated since the scan unit 205 two-dimensionally scans the display light L from the light source unit 206 in FIG. 2 from, for example, a position O_scrn to a position E_scrn via positions P11_scrn, P1$m$_scrn, Pn1_scrn, and Pnm_scrn in FIG. 4(B).

For example, a display area ar is set in the screen unit 207 in FIG. 4(B) so that the reflector 21 in FIG. 1 can introduce only the display image M (real image) in the display area ar to the display medium (for example, the display range set in the wind shield 101). This enables the user such as the driver of the vehicle to recognize the real image in the display area ar as the virtual image V via the display medium.

In FIG. 4(B), the part of the display image M corresponding to a plurality of frames in the screen unit 207 is essentially represented, for example, in white. In other words, the display image M that is present at least in the display area ar should be ideally formed by the display light L having a constant intensity in any position. However, as illustrated in FIG. 4(B), ringing is caused in the display image M that is represented, for example, in white. Accordingly, ringing is also caused in the virtual image V recognized by the user. The display image M (horizontal striped pattern) in FIG. 4(B) is drawn conceptually to describe ringing.

The horizontal axis in FIG. 4(C) represents a vertical position in the display area ar in FIG. 4(B), a vertical position P1_scrn in FIG. 4(C) corresponds to a vertical component YP11_scrn of, for example, a position P11_scrn in FIG. 4(B), and a vertical position Pn_scrn in FIG. 4(C) corresponds to a vertical component YPn1_scrn of, for example, the position Pn1_scrn in FIG. 4(B). In addition, the vertical position P1_scrn in FIG. 4(C) corresponds to a vertical component YPnm_scrn of, for example, the position P1$m$_scrn in FIG. 4(B) and the vertical position Pn_scrn in FIG. 4(C) corresponds to the vertical component YPnm_scrn of, for example, the position Pnm_scrn in FIG. 4(B). The vertical axis in FIG. 4(C) represents the brightness in the vertical direction in the display area ar. In FIG. 4(C), the magnitude of ringing depends on the difference between the maximum value Lmax and the minimum value Lmin of the brightness. Changes in the brightness in FIG. 4(C) are represented conceptually to describe ringing.

Such ringing is caused by the sawtooth-shaped waveform of the conventional vertical drive voltage V_vtcl in FIG. 4(A). That is, in FIG. 4(A), the conventional vertical drive voltage V_vtcl sharply changes at maximum value Vmax. Similarly, the conventional vertical drive voltage V_vtcl sharply changes at minimum value Vmin. This causes high frequency components of the conventional vertical drive voltage V_vtcl to occur in the conventional vertical drive voltage V_vtcl. When high frequency components of the conventional vertical drive signal include the resonance frequency (vertical resonance frequency) specific to the low speed scan element 205V, the low speed scan element 205V is resonated by the high frequency components to cause ringing in the display image M.

Next, the image display device in PTL 2 reduces the high frequency components of the vertical drive signal (non-resonance mode) having the resonance frequency (vertical resonance frequency) specific to the low speed scan element 205V by performing low-pass filtering and notch filtering on the vertical drive signal (conventional vertical drive voltage V_vtcl in FIG. 4(A)) having the sawtooth-shaped waveform, so that ringing can be reduced. However, the inventors and the like have recognized that such a vertical drive signal (non-resonance mode) should be reduced. In other words, the inventors and the like have recognized that the image display device in PTL 2 cannot reduce ringing sufficiently.

By the way, the processing unit 201 in FIG. 2 needs to generate the vertical drive signal (vertical drive voltage V_vtcl) in consideration of the horizontal resonance frequency of the high speed scan element 205H. First, the waveform of the vertical drive signal (non-resonance mode) needs to have a component that depends on the horizontal resonance frequency. Specifically, in the image display device in PTL 2, the component that depends on the horizontal resonance frequency includes the first waveform (variable display waveform) having an inclination that depends on the horizontal resonance frequency and the start point and the end point of the first waveform correspond to the position P11_scrn and the position Pnm_scrn in FIG. 4(A). For example, in the image display device in PTL 2, the inclination of the first waveform of the vertical drive signal (vertical drive voltage V_vtcl) is reduced as the horizontal resonance frequency of the high speed scan element 205H is reduced.

Secondly, the cycle (frame cycle) of the vertical drive signal (non-resonance mode) needs to be fixed. Specifically, since a vertical scan cycle T_vtcl (frame cycle) in FIG. 4(A) needs to be fixed in the image display device in PTL 2, when the inclination of the first waveform (variable display waveform) becomes, for example, smaller, the second waveform (variable non-display waveform) other than the first waveform of the vertical drive voltage V_vtcl sharply changes at the maximum value Vmax and the minimum value Vmin. After that, even when the vertical drive signal undergoes low-pass filtering and notch filtering, effects of sharp changes of the vertical drive voltage V_vtcl (variable non-display waveform) remain. Accordingly, when the inclination of the first waveform becomes, for example, smaller, reduction (that is, reduction in ringing) in high frequency components of the vertical drive signal (variable non-display waveform) having the resonance frequency (vertical resonance frequency) specific to the low speed scan element 205V is insufficient in the image display device in PTL 2. In other words, even in a situation in which, for example, ringing is reduced at the standard temperature, ringing is not substantially reduced at, for example, another temperature on the high temperature side.

To improve the conventional vertical drive voltage V_vtcl in FIG. 4(A) and the vertical drive voltage V_vtcl in PTL 2, the inventors and the like have caused the processing unit 201 (the processing unit 201 according to the invention) in FIG. 2 to generate the vertical drive signal having the variable display waveform that depends on the horizontal resonance frequency of the high speed scan element 205H, the fixed first non-display waveform that does not depend on the horizontal resonance frequency, and the variable second non-display waveform that depends on the horizontal resonance frequency. The vertical drive signal according to the invention will be described below with reference to FIGS. 5A to 5C.

Figure 5A:
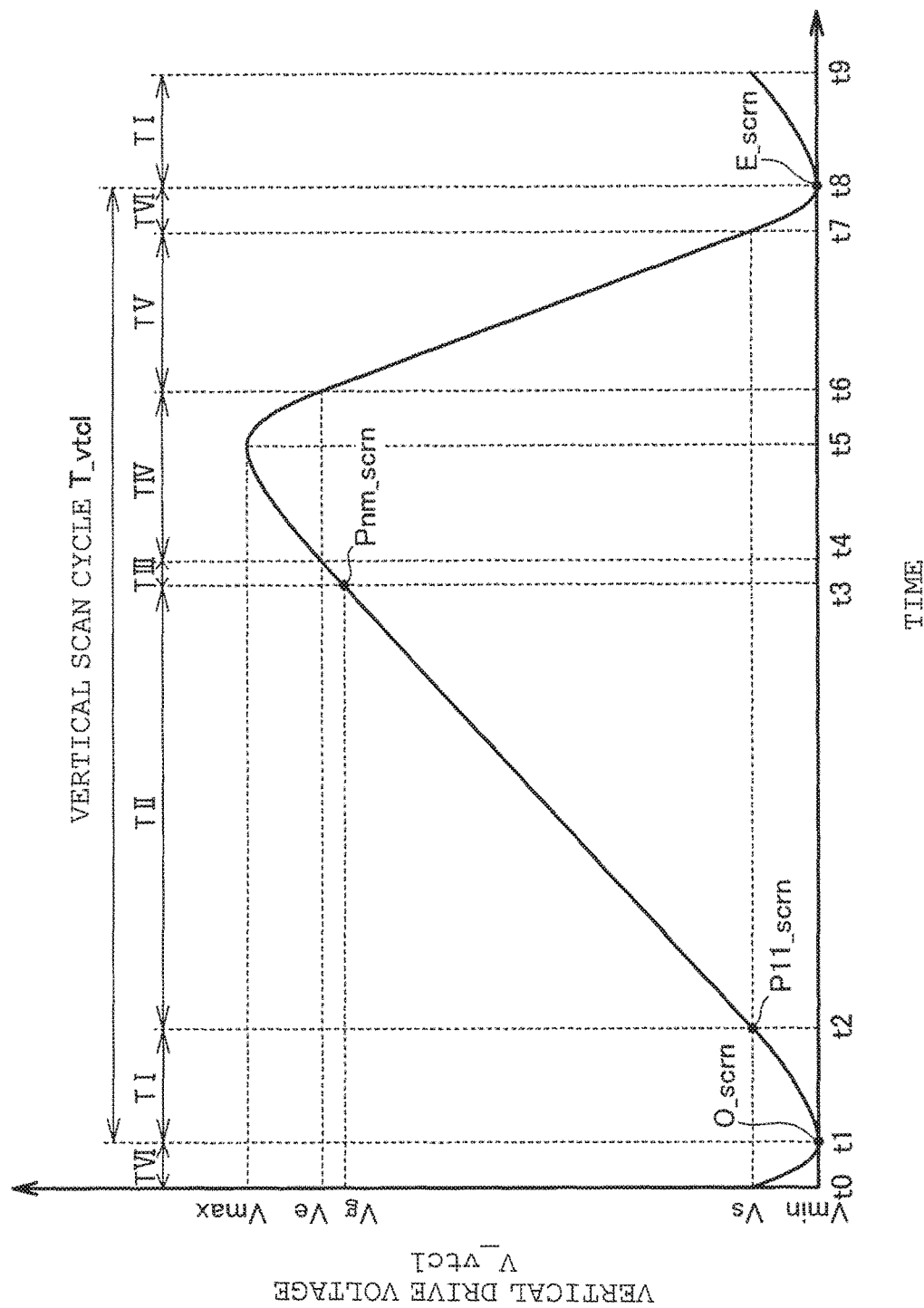
FIG. 5A is an explanatory diagram of the vertical drive signal (first vertical drive signal) at the standard temperature generated by the processing unit in FIG. 2.

FIG. 5A is an explanatory diagram of the vertical drive signal (first vertical drive signal) at the standard temperature generated by the processing unit 201 (processing unit 201 according to the invention) in FIG. 2. First, since the waveform of the vertical drive signal (non-resonance mode) needs to have a component that depends on the horizontal resonance frequency, the processing unit 201 generates the vertical drive signal so that the voltage values of the vertical drive signal at the standard temperature corresponding to the start point and the end point of the display area ar form a value Vs and a value Vg of the vertical drive voltages V_vtcl at time t2 and time t3 in FIG. 5A. The vertical drive signal (vertical drive voltage V_vtcl in FIG. 5A) at the standard temperature has the variable display waveform that depends on the horizontal resonance frequency of the high speed scan element 205H in a section TII from time t2 to time t3. In other words, the section TII from time L2 to time t3 is obtained by multiplying the reciprocal of the horizontal resonance frequency f_reso (20) at, for example, 20 degrees centigrade in FIG. 3 by the number (vertical resolution) of lines in the display area ar.

Figure 5B:
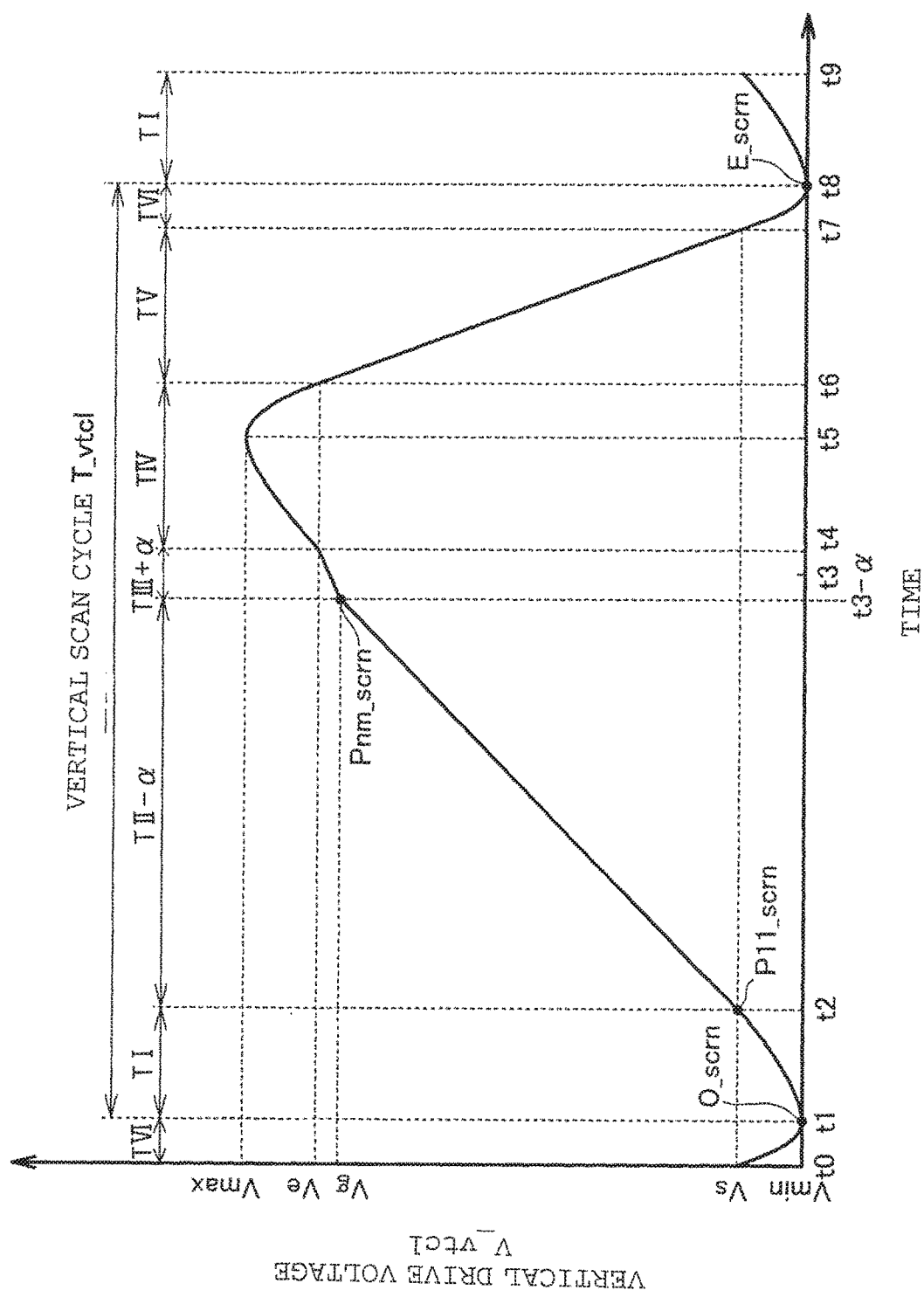
FIG. 5B is an explanatory diagram of the vertical drive signal (second vertical drive signal) on the low temperature side generated by the processing unit in FIG. 2.

Next, FIG. 5B is an explanatory diagram of the vertical drive signal (second vertical drive signal) on the low temperature side generated by the processing unit 201 in FIG. 2. When the temperature of the high speed scan element 205H is reduced, the horizontal resonance frequency of the high speed scan element 205H is increased to the horizontal resonance frequency f_reso (−40) at, for example, −40 degrees centigrade in FIG. 3 and the section TII in FIG. 5A is reduced to a section TII−α from time t2 to time t3−α in FIG. 5B. In other words, the processing unit 201 determines the inclination or change rate of the vertical drive signal so that the voltage values of the vertical drive signal on the low temperature side corresponding to the start point and the end point of the display area ar form the value Vs and the value Vg of the vertical drive voltage V_vtcl at time t2 and time t3−α in FIG. 5E, and generates variable display waveform (TII−α) that depends on the horizontal resonance frequency f_reso (−40) of the high speed scan element 205H.

Figure 5C:
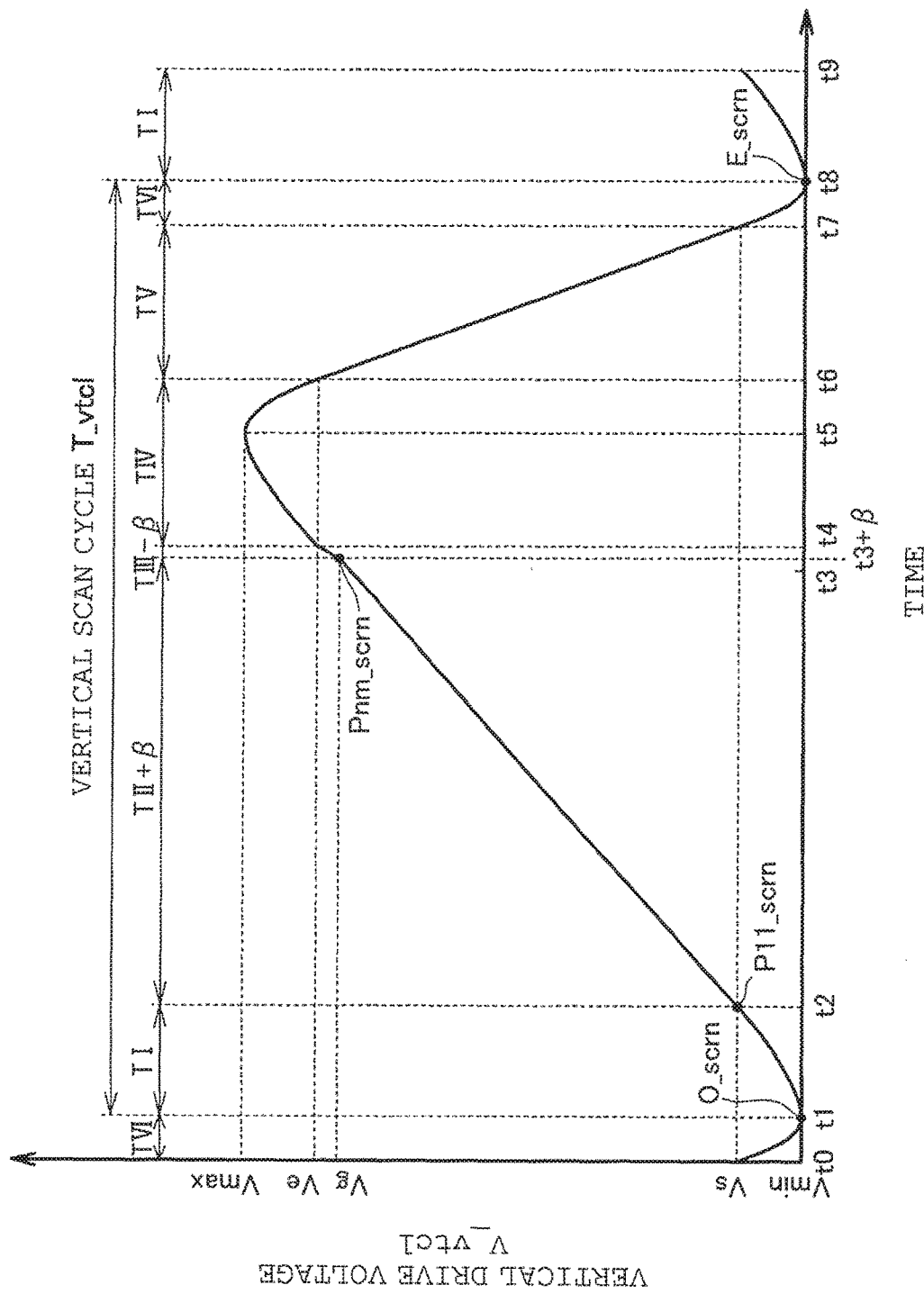
FIG. 5C is an explanatory diagram of the vertical drive signal (third vertical drive signal) on the high temperature side generated by the processing unit in FIG. 2.

In contrast, FIG. 5C is an explanatory diagram illustrating the vertical drive signal (third vertical drive signal) on the high temperature side generated by the processing unit 201 in FIG. 2. When the temperature of the high speed scan element 205H is increased, the horizontal resonance frequency of the high speed scan element 205H is reduced to the horizontal resonance frequency f_reso (85) at, for example, 85 degrees centigrade in FIG. 3 and the section TII in FIG. 5A is enlarged to a section TII+β from time t2 to time t3+β in FIG. 5C. In other words, the processing unit 201 determines the inclination or the change rate of the vertical drive signal so that the voltage values of the vertical drive signal on the low temperature side corresponding to the start point and the end point of the display area ar form the value Vs and the value Vg of the vertical drive voltage V_vtcl at time t2 and time t3+β in FIG. 5C, and generates a variable display waveform (TII−β) that depends on a horizontal resonance frequency f_reso (80) of the high speed scan element 205H, As illustrated in FIGS. 5A, 5B, and 5C, the vertical drive signal (vertical drive voltage V_vtcl) has the variable display waveform that depends on the horizontal resonance frequency of the high speed scan element 205H. In addition, since the vertical drive signal (vertical drive voltage V_vtcl) further has the fixed first non-display waveform that does not depend on the horizontal resonance frequency of the high speed scan element 205H and the variable second non-display waveform that depends on the horizontal resonance frequency, the non-display waveforms (the fixed first non-display waveform and the variable second non-display waveform) will be described below.

Secondly, since the cycle (frame cycle) of the vertical drive signal (non-resonance mode) needs to be fixed, the vertical scan cycle T_vtcl (frame cycle) in FIGS. 5A, 5B, and 5C is fixed. The vertical scan cycle T_vtcl is the section from time t1 to time t8 corresponding to the start point and the end point of the screen unit 207 and the vertical scan cycle T_vtcl is the reciprocal of, for example, the frame frequency of 60 Hz (=the frame rate of 60 fps, that is, 1/60 sec(≅ 16.7 milliseconds). In other words, even in a situation in which the section TII (display waveform section) in FIG. 5A is reduced or enlarged, the processing unit 201 can adjust the other sections (non-display waveform sections) in FIG. 5A, which are TI, TIII, TIV, TV, and TVI so that the vertical scan cycle T_vtcl (for example, 16.7 milliseconds) is fixed.

As illustrated in, for example, FIGS. 5B and 5C, the processing unit 201 can adjust only a section TIII (second non-display waveform section) in FIG. 5A while fixing sections TI, TIV, TV, and TVI (first non-display waveform sections) in FIG. 5A. Specifically, when the section TII in FIG. 5A is reduced to the section TII−α in FIG. 5B, the processing unit 201 can enlarge the section TIII in FIG. 5A to a section TIII+α in FIG. 5B. In contrast, when the section TII in FIG. 5A is enlarged to a section TII+β in FIG. 5C, the processing unit 20I can reduce the section TIII in FIG. 5A to a section TIII−β in FIG. 5C.

Referring to FIG. 5B and FIG. 5C, the non-display waveform of the vertical drive signal (vertical drive voltage V_vtcl) in FIG. 5A has the fixed first non-display waveform (sections TI, TIV, TV, and TVI) and the variable second non-display waveform (section TIII). The first non-display waveform is fixed so as not to depend on the horizontal resonance frequency of the high speed scan element 205H. In particular, the fixed first non-display waveform includes the non-display sections (sections TIV, TVI, and TI) corresponding to the maximum level and the minimum level (maximum value Vmax and minimum value Vmin of the vertical drive voltage V_vtcl) of the vertical drive signal. In other words, since many of high frequency components of the vertical drive signal are caused by changes in the vertical drive signal at the maximum level and the minimum level, ringing is reduced by causing the vertical drive signal to have the fixed first non-display waveform in non-display sections (sections TIV, TVI, and TI) in which many of high frequency components of the vertical drive signal are caused. Accordingly, even in a situation in which the horizontal resonance frequency of the high speed scan element 205H is changed, the fixed first non-display waveform (in particular, the waveform in the sections TIV, TVI, and TI) of the vertical drive signal (vertical drive voltage V_vtcl) in FIGS. 5A, 5B, and 5C can maintain reduction or suppression of ringing.

FIGS. 6(A) and 6(B) are explanatory diagrams illustrating an image that is based on the vertical drive signal (first vertical drive signal) in FIG. 5A and the brightness thereof, respectively, and FIGS. 6(C) and 6(D) are explanatory diagrams illustrating an image that is based on a modification of the vertical drive signal (first vertical drive signal) in FIG. 5A and the brightness thereof, respectively. The display images M (horizontal striped patterns) in FIGS. 6(A) and 6(C) are drawn conceptually to describe ringing. Similarly, changes in the brightness in FIG. 6(B) and FIG. 6 (D) are drawn conceptually to describe ringing.

As illustrated in FIGS. 6(A) and 6(B), the conventional ringing in FIG. 4(B) is sufficiently reduced and the size (the difference between the maximum value Lmax and the minimum value Lmin of the brightness) of ringing according to the invention becomes sufficiently small. Although changes in the convex portions (crest portions) and concave portions (trough portions) of the vertical drive signal (vertical drive voltage V_vtcl) according to the invention are gentler than in conventional vertical drive signal in FIG. 4(A) in FIG. 5A, such gentle changes may be set for only one of the convex portions and the concave portions of the vertical drive signal. For example, the vertical drive signal in FIG. 5A can be deformed so that the waveforms in the sections TI and TVI in FIG. 5A are sawtooth-shaped. In such deformation, as illustrated in FIGS. 6(C) and 6(D), the conventional ringing in FIG. 4(B) is reduced and the size of the ringing according to the invention (modification of the first vertical drive signal) becomes smaller.

Figure 7:
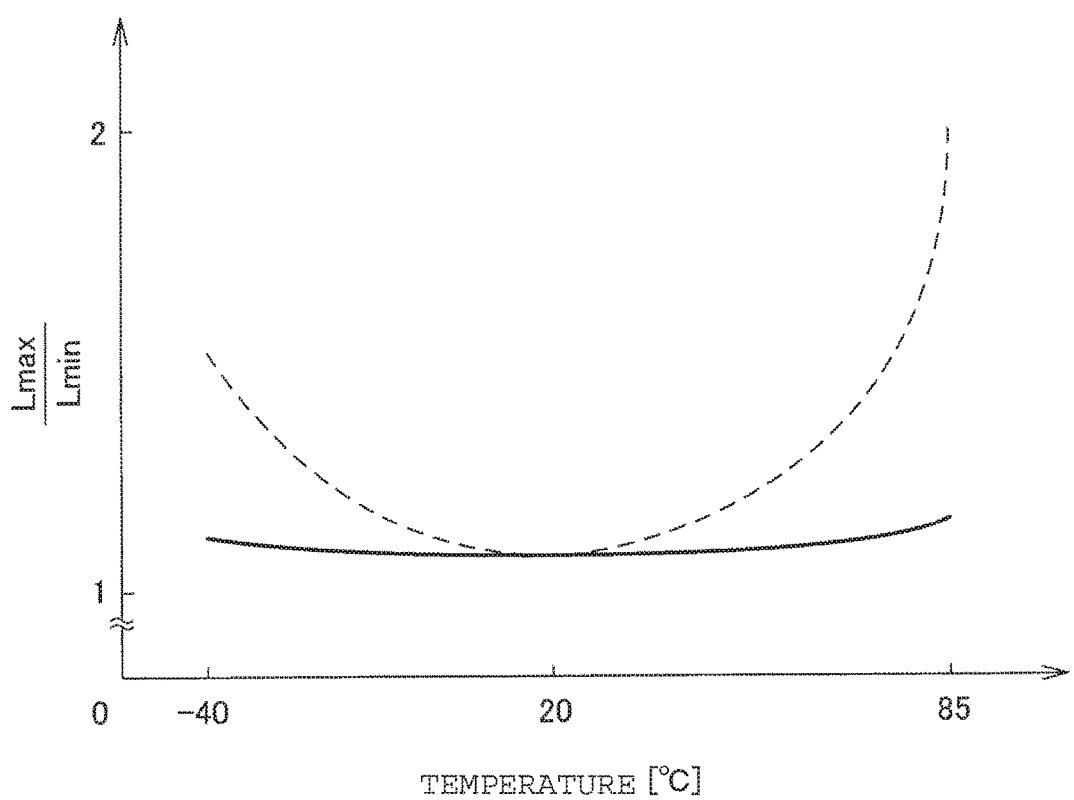
FIG. 7 is an explanatory diagram of the temperature characteristics in the range in which the brightness changes in FIG. 6(B).

FIG. 7 is an explanatory diagram of the temperature characteristics in the range in which the brightness changes in FIG. 6(B). As illustrated in FIG. 6(B), the brightness in the vertical direction in the display area ar caused by the vertical drive signal (first vertical drive signal) at the standard temperature in FIG. 5A changes between the maximum value Lmax and the minimum value Lmin. As illustrated in FIG. 7, the maximum value Lmax of the brightness divided by the minimum value Lmin at the standard temperature (for example, 20 degrees centigrade) can be close to the ideal value (1) at which ringing disappears completely. In other words, although the horizontal pattern of the display image M is indicated conceptually in the image in FIG. 6(A), it is preferable to set or adjust gentle changes in convex portions and concave portions of the vertical drive signal at the standard temperature in FIG. 5A so that the user does not actually recognize the horizontal pattern or ringing.

Next, the maximum value Lmax of the brightness divided by the minimum value Lmin, which is the extent to which ringing is reduced or suppressed, in the vertical direction in the display area ar caused by the vertical drive signals (second and third vertical drive signals) on the low temperature side and the high temperature side in FIGS. 5B and 5C is equalized in the range (for example, the range from −40 degrees centigrade to 85 degrees centigrade) in which the horizontal resonance frequency of the high speed scan element 205H changes, as illustrated by the solid line in FIG. 7.

The dashed line in FIG. 7 indicates the extent to which ringing is reduced or suppressed when the conventional vertical drive signal in FIG. 4(A) is improved by, for example, the image display device in PTL 2. For example, even in a situation in which ringing is reduced at the standard temperature, reduction of ringing becomes insufficient as another temperature deviates from the standard temperature.

Figure 8:
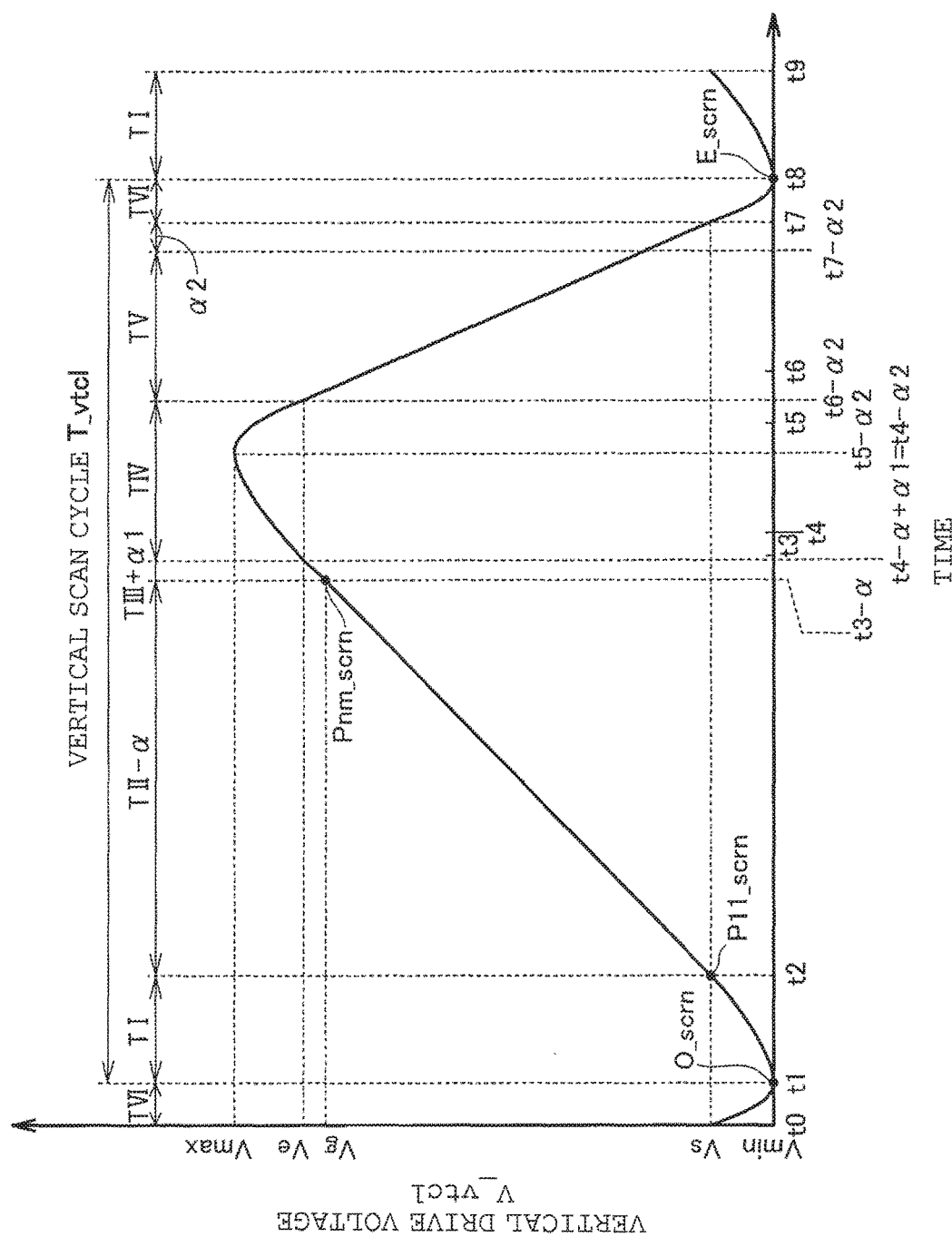
FIG. 8 is an explanatory diagram of a modification of the vertical drive signal (second vertical drive signal) in FIG. 5B.

FIG. 8 is an explanatory diagram of a modification of the vertical drive signal (second vertical drive signal) in FIG. 5B. In FIG. 5B, the fixed first non-display waveform of the vertical drive signal (vertical drive voltage V_vtcl) on the low temperature side is set for the sections TI, TIV, TV, and TVI. However, the fixed first non-display waveform may include only the sections TI, TIV, and TVI, that is, the non-display sections (sections TIV, TVI, and TI) corresponding to the maximum level and the minimum level (the maximum value Vmax and the minimum value Vmin of the vertical drive voltage V_vtcl) of the vertical drive signal (see FIG. 8). In other words, in FIG. 8, the variable second non-display waveform of the vertical drive signal (vertical drive voltage V_vtcl) includes sections TV and α2 in addition to a section TIII+α1.

Specifically, in FIG. 8, the processing unit 201 sets the section TIII in FIG. 5A for the section TIII+α1 instead of the section TIII+α in FIG. 5B so that the inclination or the change rate of the vertical drive signal (vertical drive voltage V_vtcl) in the section TIII+α1 can be identical or close to the inclination or the change rate in, for example, the section TII−α. In other words, the processing unit 201 can determine the inclination or the change rate of the level of the vertical drive signal in the section TIII+α1 based on the inclination or the change rate in the section TII−α so that the vertical drive voltage V_vtcl at time t3−α and time t4−α−α1 (=t4−α2) forms the value Vg and a value Ve.

The processing unit 201 may make the inclination or the change rate of the vertical drive signal (vertical drive voltage V_vtcl) in the section TIII+α1 in FIG. 8 identical or close to, for example, the inclination or the change rate at the start point (time t4−α2) in the section TIV in FIG. 8. In addition, the processing unit 201 does not need to fix the inclination or the change rate of the vertical drive signal (vertical drive voltage V_vtcl) in the section TIII+α1 in FIG. 8. Accordingly, the waveform in, for example, the section TIII+α1 in FIG. 8 may be a curve instead of a straight line. When the waveform in, for example, the section TIII+α1 in FIG. 8 is a straight line, the load on the processing unit 201 for generating the straight line is reduced. Alternatively, when the waveform in, for example, the section TIII+α1 in FIG. 8 is a curve, the curve may have, for example, an inflection point at, for example, the middle point of, for example, the section TIII+α1 to further reduce ringing.

Next, the processing unit 201 can generate the vertical drive signal (vertical drive voltage V_vtcl) in the section TIV in FIG. 8 based on fixed data stored in, for example, the storage unit 202. The fixed data required to generate the fixed first non-display waveform (sections TI, TIV, and TVI) is stored in the storage unit 202. Accordingly, the processing unit 201 does not need to generate the fixed data in real time. In other words, the load on the processing unit 201 for generating the fixed first non-display waveform is reduced. In addition, since the fixed first non-display waveform does not depend on the horizontal resonance frequency of the high speed scan element 205H, the capacity of the storage unit 202 is reduced. The processing unit 201 may generate fixed data in real time.

Next, the processing unit 201 may determine the inclination or the change rate of the level of the vertical drive signal in the sections TV and α2 so that the vertical drive voltage V_vtcl at time t6−α2 and time t7 forms the value Ve and the value Vs, respectively. Since the vertical scan cycle T_vtcl (for example, 16.7 milliseconds) is fixed, the processing unit 201 can determine the equation α2=α−α1 based on the expression −α+α1+α2=0. In other words, the processing unit 201 can divide the section TIII in FIG. 5A into, for example, the two sections (section TIII+α1 and section α2 in FIG. 8) instead of the section TIII+α in FIG. 5B.

The processing unit 201 may make the inclination or the change rate of the vertical drive signal (vertical drive voltage V_vtcl) in the section TV in FIG. 8 close to the inclination or the change rate in, for example, the section TV in FIG. 5B. Accordingly, for example, the waveforms in the sections TV and α2 in FIG. 8 may be, for example, two straight lines instead of one straight line. Of course, for example, the waveform in the section TV and/or the waveform in the section α2 in FIG. 8 may be curves instead of straight lines.

Referring to FIGS. 5A, 5B, 5C, and 8, in the vertical drive signal (vertical drive voltage V_vtcl) according to a preferred embodiment of the invention, the fixed first non-display waveform includes the sections TI, TIV, and TVI, that is, the non-display sections (sections TIV, TVI, and TI) corresponding to the maximum level and the minimum level (maximum value Vmax and minimum value Vmin of the vertical drive voltage V_vtcl) of the vertical drive signal. The absolute value of the change rate of the level of the vertical drive signal at the maximum level and/or the minimum level is the minimum value, that is, the change rate is zero. Accordingly, high frequency components of the vertical drive signal are more difficult to generate at the maximum level and/or the minimum level.

In addition, in the first of the section TIV in which the current level of the vertical drive signal generated by the processing unit 201 approaches the maximum level, the absolute value of the change rate of the current level is preferably reduced to the minimum value (zero) gradually. In addition, in the second half of the section TIV in which the current level deviates from the maximum level, the absolute value of the change rate of the current level is preferably increased from the minimum value gradually. Similarly, in the section TVI in which the current level of the vertical drive signal generated by the processing unit 201 approaches the minimum level, the absolute value of the change rate of the current level is preferably reduced to the minimum value gradually. In addition, in the section TI in which the current level deviates from the minimum level, the absolute value of the change rate of the current level is preferably increased from the minimum value gradually. When the change rate of the level of the vertical drive signal is small at a level close to the maximum level and the minimum level, high frequency components of the vertical drive signal are more difficult to generate at the maximum level and the minimum level.

In FIG. 5C, the fixed first non-display waveform can include only the sections TI, TIV, and TVI. In other words, as in the method illustrated in FIG. 8, the processing unit 201 can generate a modification (not illustrated) of the vertical drive signal (vertical drive voltage V_vtcl) on the high temperature side in FIG. 5C. Specifically, in a modification of the vertical drive signal on the high temperature side in FIG. 5C, the processing unit 201 can make the inclination or the change rate of the vertical drive signal (vertical drive voltage V_vtcl) in the section between the section TII+β and the section TIV in FIG. 5C identical or close to the inclination or the change rate in, for example, the section TII+β without setting the section TIII in FIG. 5A for the section TII+β in FIG. 5C.

By the way, since the effects of the temperature characteristics of the low speed scan element 205V cannot be ignored depending on the type of the low speed scan element 205V, the detection unit 203 in FIG. 2 preferably has a temperature detection unit capable of detecting the temperature of the low speed scan element 205V. Of course, when the detection unit 203 does not have the temperature detection unit, the processing unit 201 may estimate the temperature of the low speed scan element 205V by receiving data that is based on the temperature via, for example, the LAN 300 and the display controller 200 in FIG. 1. The processing unit 201 can correct, for example, the vertical drive signals (second and third vertical drive signals) on the low temperature side and the high temperature side in FIGS. 5B and 5C in consideration of the effects of the temperature characteristics of the low speed scan element 205V.

Figure 9A:
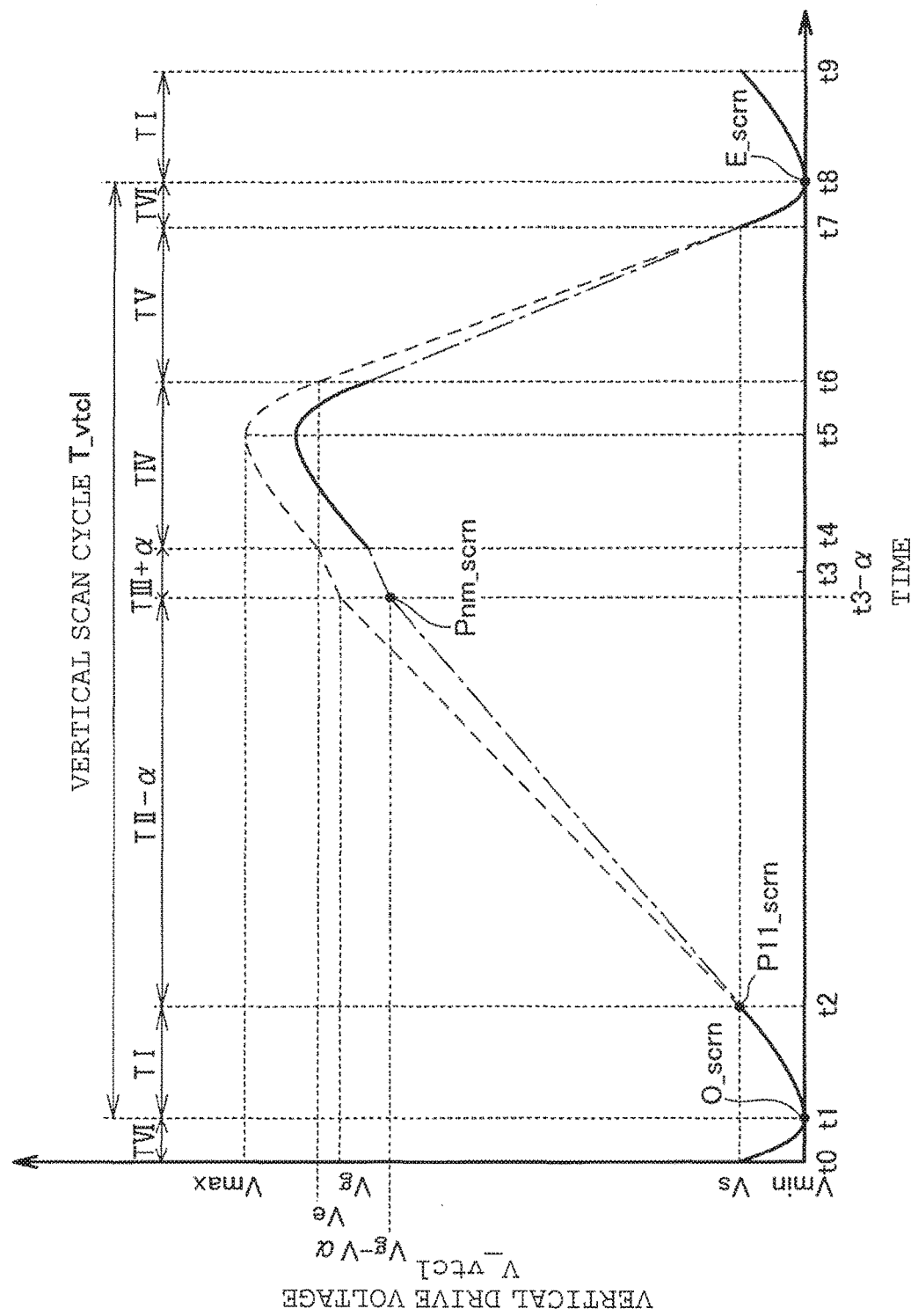
FIG. 9A is an explanatory diagram of the level correction of the vertical drive signal (second vertical drive signal) in FIG. 5B.

FIG. 9A is an explanatory diagram of the level correction of the vertical drive signal (vertical drive voltage V_vtcl) on the low temperature side in FIG. 5B. When the temperature of the low speed scan element 205V is reduced, the rotation range or vibration range of the low speed scan element 205V driven in the non-resonance mode (vertical drive voltage) by the vertical drive signal may be enlarged. In response to this, the processing unit 201 can reduce the difference between the value and the value Vs in FIG. 5B to the different between a value Vg−Vα and the value Vs in FIG. 9A at minimum by multiplying the vertical drive signals (vertical drive voltages V_vtcl) in the sections TII−α, TIII+α, and TV in FIG. 5B by, for example, a coefficient (for example, a common coefficient) less than 1. As described above, the processing unit 201 can change the range of the level of the variable display waveform based on the temperature of the low speed scan element 205V. Accordingly, even in a situation in which the temperature of the low speed scan element 205V is reduced, the processing unit 201 can fix the size of the display area ar.

The dashed line (sections TII−α, TIII+α, TIV, and TV) in FIG. 9A matches the solid line in FIG. 5B, and the dot-dash line (sections TII−α, TIII+α, and TV) in FIG. 9A represents the vertical drive voltage V_vtcl having the corrected inclination or change rate. The solid line (sections TIV, TVI, and TI) in FIG. 9A represents the vertical drive voltage V_vtcl (fixed first non-display waveform) having the fixed inclination or the change rate. The fixed first non-display waveform can maintain the reduction or suppression of ringing.

In FIG. 9A, the processing unit 201 corrects the inclination or the change rate of the vertical drive signal (vertical drive voltage V_vtcl) in the sections TII−α, TIII+α, and TV. However, to fix the size of the display area ar, the processing unit 201 may correct the inclination or the change rate of only the vertical drive signal (vertical drive voltage V_vtcl) in the sections TII−α and TV and may fix the inclination or the change rate of the vertical drive signal (vertical drive voltage V_vtcl) in the section TIII+α. However, when the inclination or the change rate of the vertical drive signal (vertical drive voltage V_vtcl) in the section TIII+α is fixed, the coefficient (each coefficient) less than, for example, 1 in the section TII−α differs from the coefficient (each coefficient) less than, for example, 1 in the section TV. In contrast, when the coefficient less than, for example, 1 is a common coefficient, the load on the processing unit 201 for uniformly generating the dot-dash line (sections TII−α, TIII+α, and TV) in FIG. 9A in a botch is reduced.

Figure 9B:
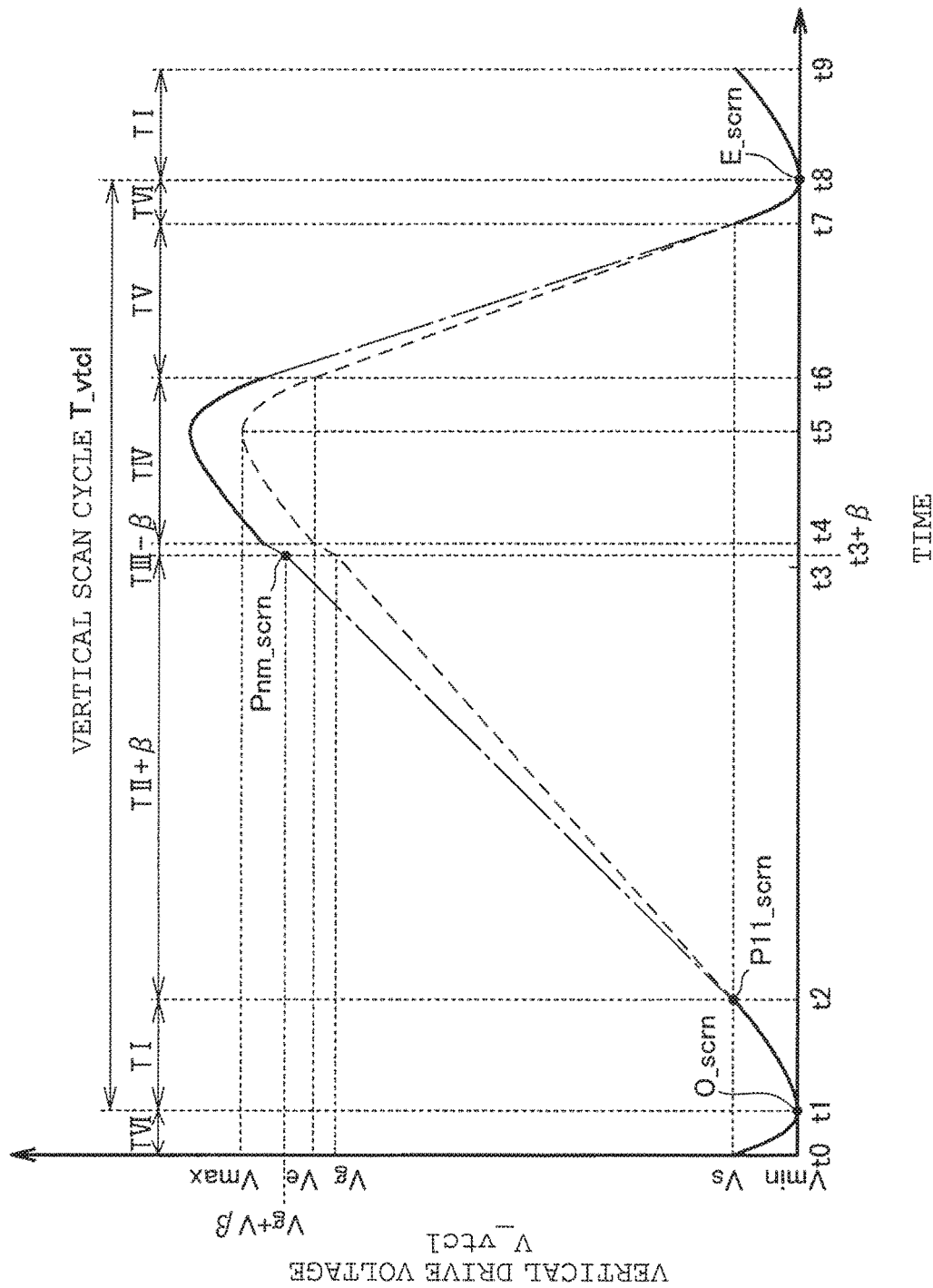
FIG. 9B is an explanatory diagram of the level correction of the vertical drive signal (third vertical drive signal) in FIG. 5C.

FIG. 9B is an explanatory diagram of the level correction of the vertical drive signal (vertical drive signal V_vtcl) on the high temperature side in FIG. 5C. When the temperature of the low speed scan element 205V is increased, the rotation range or vibration range of the low speed scan element 205V driven in the non-resonance mode (vertical drive voltage) by the vertical drive signal may be reduced. In response to this, the processing unit 201 can increase the difference between the value Vg and the value Vs in FIG. 5C up to the different between a value Vg+Vβ and the value Vs in FIG. 9A by multiplying the vertical drive signals (vertical drive voltages V_vtcl) in the sections TII+β, TIII−β, and TV in FIG. 5C by a coefficient (for example, a fixed coefficient), for example, more than 1. As described above, the processing unit 201 can change the range of the level of the variable display waveform based on the temperature of the low speed scan element 205V. Accordingly, even in a situation in which the temperature of the low speed scan element 205V is increased, the processing unit 201 can fix the size of the display area ar.

The dashed line (sections TII+β, TIII−β, TIV, and TV) in FIG. 9B matches the solid line in FIG. 5C, and the dot-dash line (sections TII+β, TIII−β, and TV) in FIG. 9B represents the vertical drive voltage V_vtcl having the corrected inclination or change rate. The solid line (sections TIV, TVI, and TI) in FIG. 98 represents the vertical drive voltage V_vtcl (fixed first non-display waveform) having the fixed inclination or the change rate. In addition, in FIG. 9B, the processing unit 201 corrects the inclination or the change rate of the vertical drive signal (vertical drive voltage V_vtcl) in the sections TII+β, TIII−β, and TV. However, to fix the size of the display area ar, the processing unit 201 may correct the inclination or the change rate of only the vertical drive signal (vertical drive voltage V_vtcl) in the sections TII+β and TV and may fix the inclination or the change rate of the vertical drive signal (vertical drive voltage V_vtcl) in the section TIII−β.

The invention is not limited to the embodiment illustrated above and those skilled in the art can easily modify the embodiment illustrated above within the scope of the appended claims. In addition, those skilled in the art can easily understand that the embodiment illustrated can be further modified without departing from the spirit of the invention.

INDUSTRIAL APPLICABILITY

The invention is applied to a h up display device to be mounted in a conveyance such as a vehicle.

REFERENCE SIGNS LIST

20: display
21: reflector
100: display mechanism
101: wind shield
102: view point 200: display controller
201: processing unit
202: storage unit
203: detection unit
204: drive unit
205: scan unit
205H: high speed scan element (first scan element)
205V: low speed scan element (second scan element)
206: light source unit
207: screen unit
300: LAN
ar: display area
DATA: image data
H: horizontal line
L: display light
M: display image (real image)
V: virtual image

The invention claimed is:

1. A head-up display device provided with a display mechanism including a display and a reflector, the display comprising:
    a light source unit capable of generating light that is an origin of a scanning line;
    a scan unit for scanning the light in a first direction and in a second direction using a first scan element and a second scan element, respectively;
    a processing unit for generating a first drive signal having a frequency identical to a resonance frequency of the first scan element; and
    a drive unit for driving the first scan element in a resonance mode that is based on the first drive signal,
    wherein the processing unit generates a second drive signal having
        a variable display waveform, a period of the variable display waveform being controlled to be longer or shorter based on the resonance frequency,
        a fixed first non-display waveform that does not depend on the resonance frequency, and
        a variable second non-display waveform, a period of the variable second non-display waveform being controlled to be longer or shorter based on the period of the variable display waveform to maintain a cycle of the second drive signal to be fixed, and
    the drive unit drives the second scan element in a non-resonance mode that is based on the second drive signal.

2. The head-up display device according to claim 1, wherein the fixed first non-display waveform is set in a non-display section corresponding to the maximum level and/or the minimum level of the second drive signal.

3. The head-up display device according to claim 2, wherein the absolute value of a change rate of a level of the second drive signal at the maximum level and/or the minimum level is the minimum value.

4. The head-up display device according to claim 3, wherein, when a current level of the second drive signal approaches the maximum level and/or the minimum level, the absolute value of the change rate of the current level is gradually reduced to the minimum value.

5. The head-up display device according to claim 3, wherein, when a current level of the second drive signal deviates from the maximum level and/or the minimum level, the absolute value of the change rate of the current level is gradually increased from the minimum value.

6. The head-up display device according to claim 1, wherein the display further includes a storage unit in which fixed data necessary to generate the fixed first non-display waveform is stored, and
    the processing unit generates the fixed first non-display waveform based on the fixed data.

7. The head-up display device according to claim 1, wherein the processing unit changes a range of a level of the variable display waveform based on a temperature of the second scan element.

* * * * *